(12) United States Patent
Benson

(10) Patent No.: US 8,669,484 B1
(45) Date of Patent: Mar. 11, 2014

(54) MOTION SENSING SWITCH ACTUATOR ASSEMBLY

(76) Inventor: Arthur J. Benson, Fort Sill, OK (US)

( * ) Notice: Subject to any disclaimer, the term of this patent is extended or adjusted under 35 U.S.C. 154(b) by 234 days.

(21) Appl. No.: 13/277,633

(22) Filed: Oct. 20, 2011

(51) Int. Cl.
*H01H 7/08* (2006.01)
*H01H 43/10* (2006.01)
*H01H 35/00* (2006.01)

(52) U.S. Cl.
USPC ......................................... 200/38 R; 307/116

(58) Field of Classification Search
USPC ........ 200/11 R, 17 R, 19 R, 20, 21, 28, 30 R, 200/19 A, 33 R, 38 R, 331; 307/116; 337/126, 139, 140
See application file for complete search history.

(56) References Cited

U.S. PATENT DOCUMENTS

| | | | |
|---|---|---|---|
| 3,171,920 A | 3/1965 | Klein et al. | |
| 4,066,922 A | 1/1978 | Hennemann et al. | |
| 5,397,869 A | 3/1995 | Huen | |
| 5,719,362 A | 2/1998 | Gray, Jr. | |
| 6,891,284 B2 * | 5/2005 | Tilley | 307/116 |
| 7,372,355 B2 * | 5/2008 | Agronin et al. | 337/126 |
| 7,608,793 B2 | 10/2009 | Agronin et al. | |
| D603,346 S * | 11/2009 | Murray et al. | D13/162 |
| 8,084,700 B1 * | 12/2011 | Massaro et al. | 200/38 R |
| 2005/0082150 A1 * | 4/2005 | Gray, Jr. | 200/38 R |
| 2009/0288937 A1 * | 11/2009 | Agronin et al. | 200/331 |

* cited by examiner

*Primary Examiner* — Rexford Barnie
*Assistant Examiner* — Rasem Mourad

(57) ABSTRACT

A motion sensing switch actuator assembly is provided for automatically switching an existing light switch upon detection of motion. The assembly includes a housing having a rear face. An actuator is slidably coupled to the rear face of the housing. The actuator is configured for engaging and flipping a switch positioned adjacent to the rear face of the housing when the actuator slides relative to the housing. A motion sensor is coupled to the housing and configured for detecting motion proximate the housing. A processor is operationally coupled to the motion sensor and the actuator to selectively slide the actuator upon detection of predetermined input from the motion sensor.

8 Claims, 5 Drawing Sheets

MOTION SENSING SWITCH ACTUATOR ASSEMBLY

BACKGROUND OF THE DISCLOSURE

Field of the Disclosure

The disclosure relates to motion sensor switch devices and more particularly pertains to a new motion sensor switch device for automatically switching an existing light switch upon detection of motion.

SUMMARY OF THE DISCLOSURE

An embodiment of the disclosure meets the needs presented above by generally comprising a housing having a rear face. An actuator is slidably coupled to the rear face of the housing. The actuator is configured for engaging and flipping a switch positioned adjacent to the rear face of the housing when the actuator slides relative to the housing. A motion sensor is coupled to the housing and configured for detecting motion proximate the housing. A processor is operationally coupled to the motion sensor and the actuator to selectively slide the actuator upon detection of predetermined input from the motion sensor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
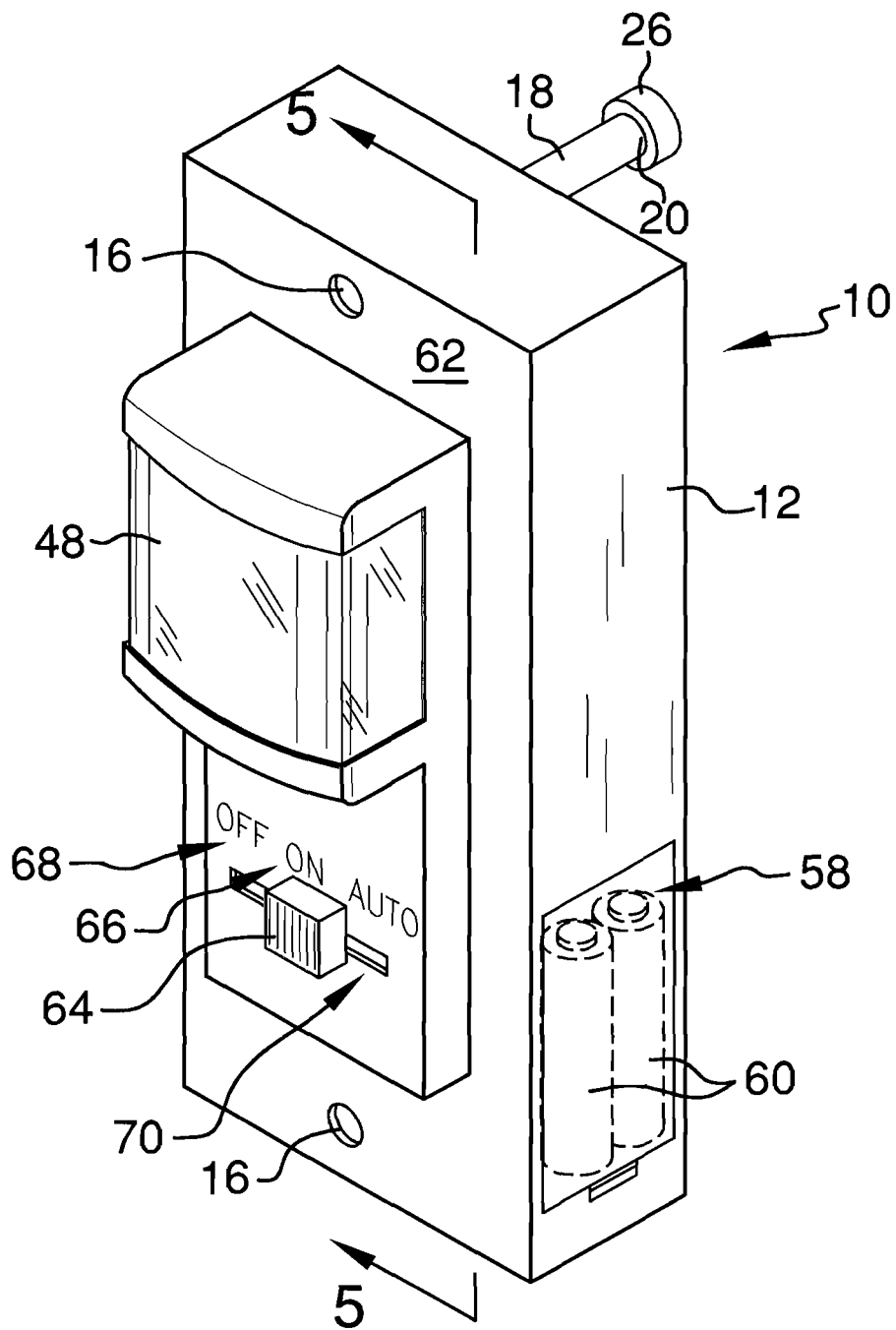
FIG. 1 is a top front side perspective view of a motion sensing switch actuator assembly according to an embodiment of the disclosure.
Figure 2:
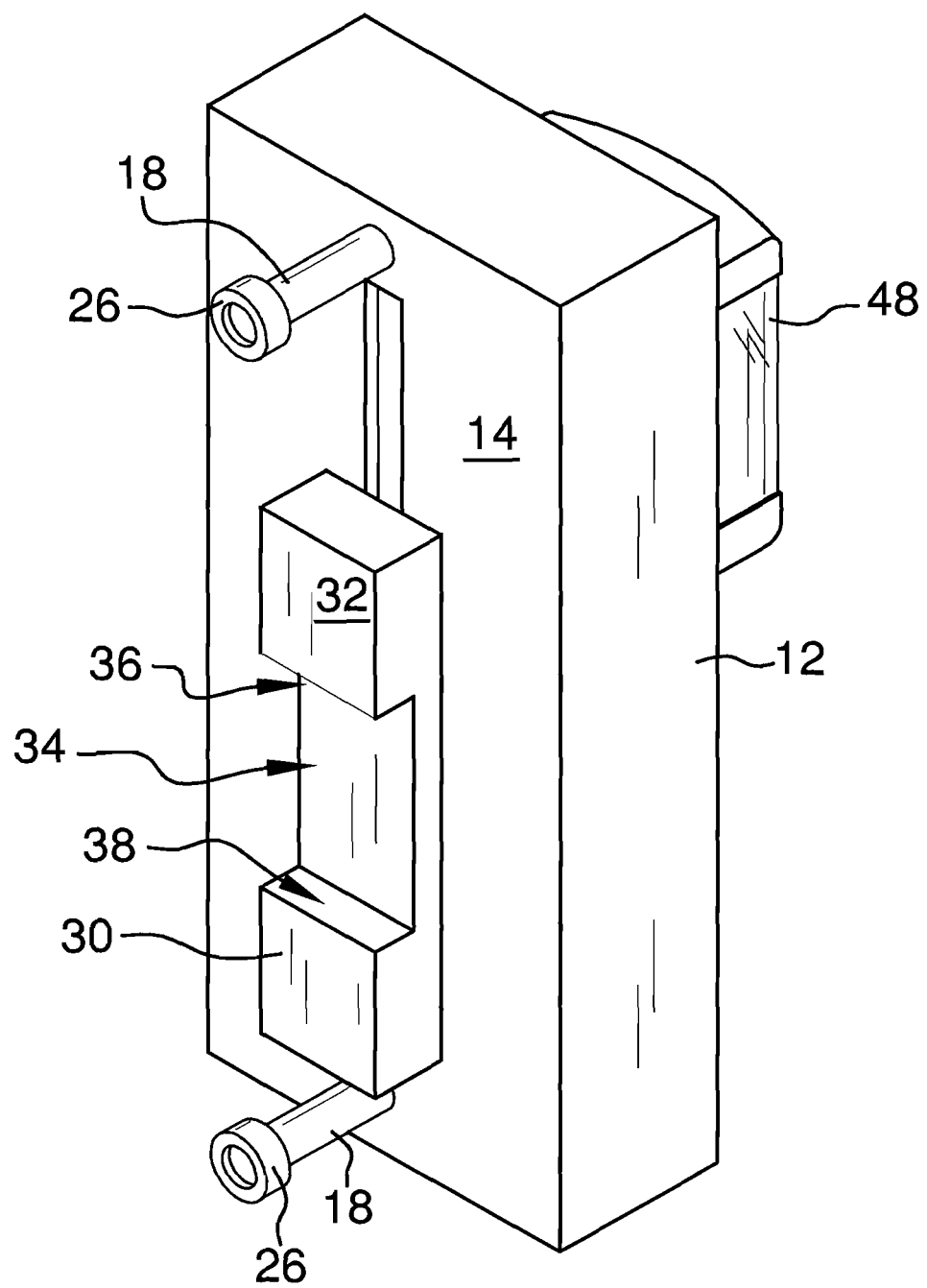
FIG. 2 is a top back side perspective view of an embodiment of the disclosure.
Figure 3:
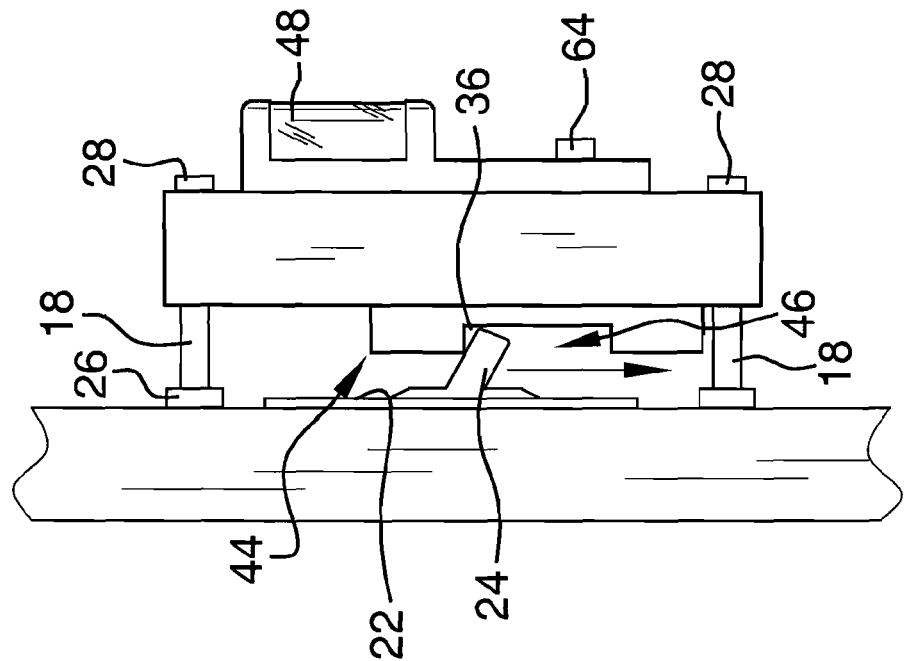
FIG. 3 is a side view of an embodiment of the disclosure.
Figure 4:
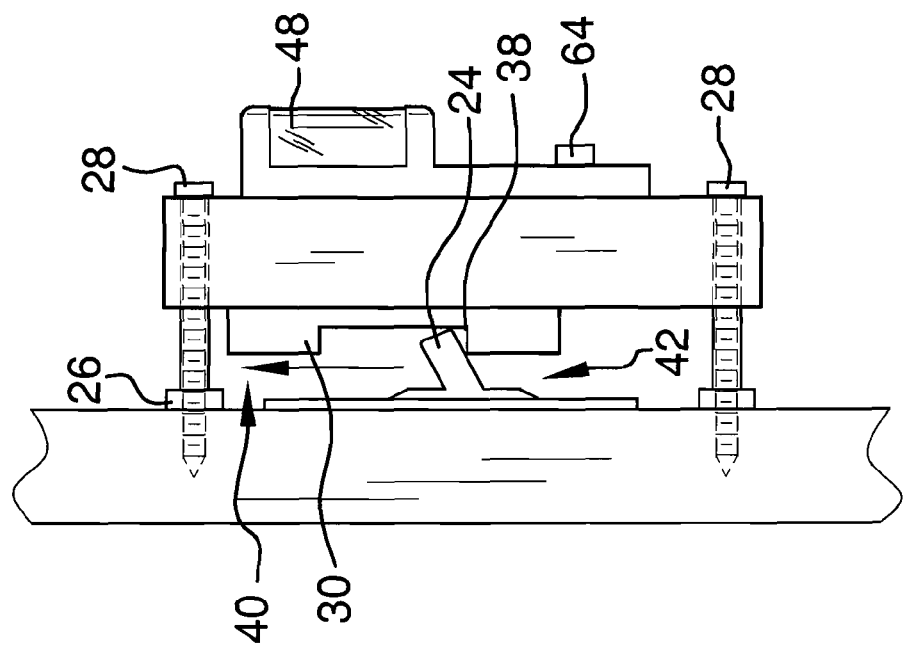
FIG. 4 is a side view of an embodiment of the disclosure.
Figure 5:
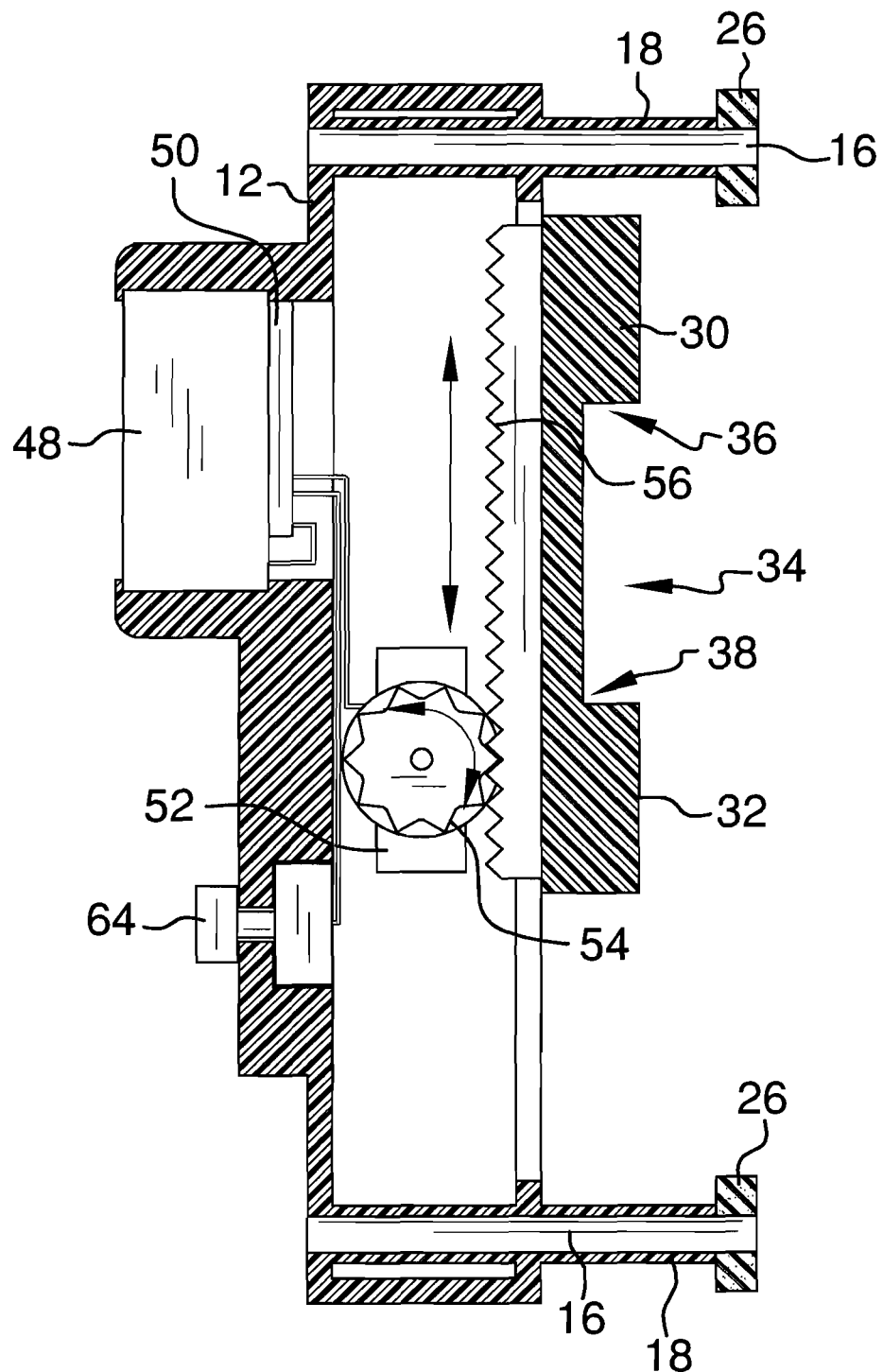
FIG. 5 is a cross-sectional view of an embodiment of the disclosure taken along line 5-5 of FIG. 1.
Figure 6:
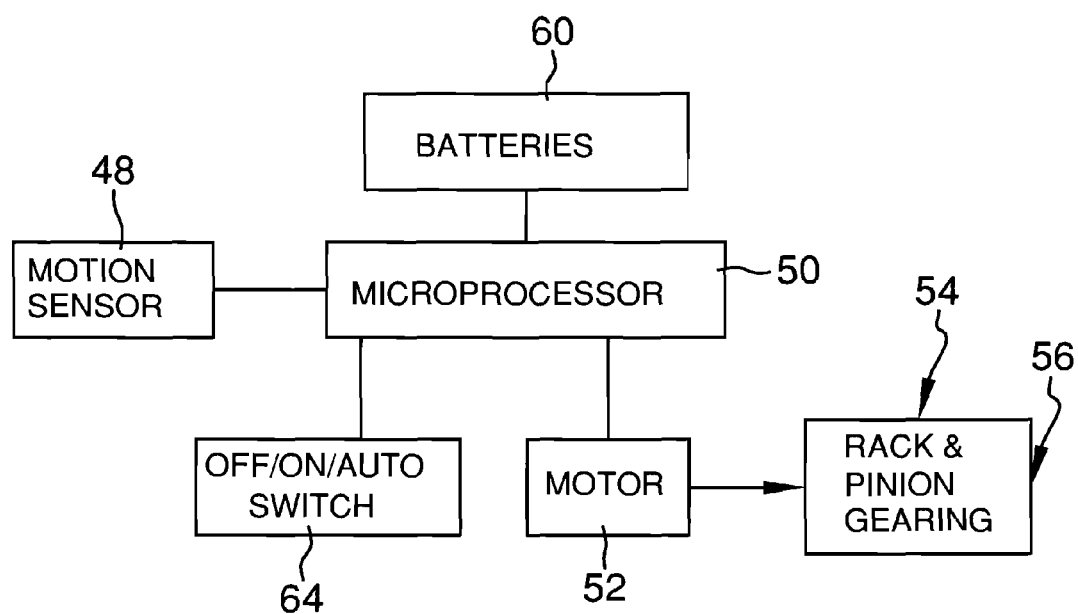
FIG. 6 is a schematic view of an embodiment of the disclosure.

With reference now to the drawings, and in particular to FIGS. 1 through 6 thereof, a new motion sensor switch device embodying the principles and concepts of an embodiment of the disclosure and generally designated by the reference numeral 10 will be described.

As best illustrated in FIGS. 1 through 6, the motion sensing switch actuator assembly 10 generally comprises a housing 12 having a rear face 14. A plurality of connection holes 16 extend through the housing 12. The connection holes 16 are positioned to align with the positioning of apertures on a conventional standardized face plate 22 and light switch 24. A plurality of spacing bars 18 is coupled to and extends from the rear face 14 of the housing 12. The spacing bars 18 are aligned with the connection holes 16 such that the connection holes 16 extend through the spacing bars 18. Thus, the housing 12 may be installed over the existing light switch 24 by replacing existing screws with elongated connection screws 28. A plurality of pads 26 may also be utilized. Each pad 26 is coupled to a distal end 20 of the associated spacing bar 18 relative to the housing 12. The pad 26 inhibits marks on the faceplate 22.

An actuator 30 is slidably coupled to the housing 12 and may extend from the rear face 14 of the housing 12. The actuator 30 is configured for engaging and flipping the switch 24 positioned adjacent to the rear face 14 of the housing 12 when the actuator 30 slides relative to the housing 12. A back face 32 of the actuator 30 has a medial cutout 34 defining an upper lip 36 and a lower lip 38. The upper lip 36 is configured for engaging the light switch 24 when the actuator 30 slides in a downward direction. The lower lip 38 is configured for engaging the light switch 24 when the actuator 30 slides in an upward direction. The actuator 30 is selectively positioned in a first position 40 configured to correspond to the light switch 24 being in an activated position 42, typically flipped upwardly. Conversely, the actuator 30 is selectively positioned in a second position 44 configured to corresponding to the light switch 24 being in a deactivated position 46.

A motion sensor 48 is coupled to the housing 12, typically on a front face 62 opposite the rear face 14. The motion sensor 48 is configured for detecting motion proximate the housing 12. The area of detection may be extended to include movement anywhere within a room.

A processor 50 is operationally coupled to the motion sensor 48 and the actuator 30 to selectively slide the actuator 30 upon detection of predetermined input from the motion sensor 30. The processor 50 may be programmed to control movement of the actuator 30 in accordance with desired conditions including meeting a threshold amount or duration of movement prior to moving the actuator 30 or movement of the actuator 30 only after a predetermined duration of non-movement.

A motor 52 is coupled to the actuator 30 and the processor 50. The motor 52 is selectively activated by the processor 50. The motor 52 may rotate a pinion gear 54 coupled to the motor 52. The pinion gear 54 may physically engage a rack gear 56 coupled to the actuator 30. A battery compartment 58 holding batteries 60 may be provided in the housing 12. The batteries 60 are electrically coupled to the motor 52 and the processor 50 to provide operational power for the assembly 10. Thus, installation is simplified and can be achieved by simple replacement of existing screws with the elongated screws 28 without removing the existing face plate 22 or switch 24.

A control 64 is coupled to the processor 50 and may be positioned in an accessible position on the front face 62 of the housing 12. The control 64 has an on position 66 corresponding to the actuator 30 being in the first position 40. The control 64 also has an off position 68 corresponding to the actuator 30 being in the second position 44. The control 64 may further have an automated position 70 corresponding to the actuator 30 being moved between the first position 40 and the second position 44 as determined by the programming of the processor 50 including moving the actuator 30 into the first position 40 upon detection of motion by the motion sensor 48.

In use, the assembly 10 is positioned over the existing faceplate 22 and light switch 24 such that the actuator 30 will engage the switch 24. Movement detected by the motion sensor 48 will move the actuator 30 in accordance to the programming of the processor 50 when in the automated position 70 or in response to the direct setting of the control 64 in the on position 66 or off position 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motion sensing switch actuator assembly comprising:
   a housing having a rear face;
   an actuator slidably coupled to said rear face of said housing, said actuator being configured for engaging and flipping a switch positioned adjacent to said rear face of said housing when said actuator slides relative to said housing;
   a motion sensor coupled to said housing, said motion sensor being configured for detecting motion proximate said housing;
   a processor operationally coupled to said motion sensor and said actuator to selectively slide said actuator upon detection of predetermined input from said motion sensor
   a plurality of connection holes extending through said housing;
   a plurality of spacing bars coupled to and extending from said rear face of said housing, said spacing bars being aligned with said connection holes, said connection holes extending through said spacing bars; and
   a plurality of pads, each pad being coupled to an associated one of said spacing bars, each pad being coupled to a distal end of said associated spacing bar relative to said housing.

2. The assembly of claim 1, further including a motor coupled to said actuator and said processor, said motor being selectively activated by said processor.

3. The assembly of claim 1, further comprising:
   a rack gear coupled to said actuator; and
   a pinion gear coupled to said motor, said rack gear engaging said pinion gear.

4. The assembly of claim 1, further including a back face of said actuator having a medial cutout defining an upper lip and a lower lip, said upper lip being configured for engaging the light switch when said actuator slides in a downward direction, said lower lip being configured for engaging the light switch when said actuator slides in an upward direction.

5. The assembly of claim 1, further comprising:
   said actuator being selectively positioned in a first position configured to correspond to the light switch being in an activated position; and
   a control coupled to said processor, said control having an on position corresponding to said actuator being in said first position.

6. The assembly of claim 5, further comprising:
   said actuator being selectively positioned in a second position configured to corresponding to the light switch being in a deactivated position; and
   said control having an off position corresponding to said actuator being in said second position.

7. The assembly of claim 6, further including said control having an automated position corresponding to said actuator being moved into said first position upon detection of motion by said motion sensor.

8. A motion sensing switch actuator assembly comprising:
   a housing having a rear face;
   a plurality of connection holes extending through said housing;
   a plurality of spacing bars coupled to and extending from said rear face of said housing, said spacing bars being aligned with said connection holes, said connection holes extending through said spacing bars;
   a plurality of pads, each pad being coupled to an associated one of said spacing bars, each pad being coupled to a distal end of said associated spacing bar relative to said housing;
   an actuator slidably coupled to said rear face of said housing, said actuator being configured for engaging and flipping a switch positioned adjacent to said rear face of said housing when said actuator slides relative to said housing, a back face of said actuator having a medial cutout defining an upper lip and a lower lip, said upper lip being configured for engaging the light switch when said actuator slides in a downward direction, said lower lip being configured for engaging the light switch when said actuator slides in an upward direction, said actuator being selectively positioned in a first position configured to correspond to the light switch being in an activated position, said actuator being selectively positioned in a second position configured to corresponding to the light switch being in a deactivated position;
   a motion sensor coupled to said housing, said motion sensor being configured for detecting motion proximate said housing;
   a processor operationally coupled to said motion sensor and said actuator to selectively slide said actuator upon detection of predetermined input from said motion sensor;
   a motor coupled to said actuator and said processor, said motor being selectively activated by said processor;
   a rack gear coupled to said actuator;
   a pinion gear coupled to said motor, said rack gear engaging said pinion gear; and
   a control coupled to said processor, said control having an on position corresponding to said actuator being in said first position, said control having an off position corresponding to said actuator being in said second position, said control having an automated position corresponding to said actuator being moved into said first position upon detection of motion by said motion sensor.

\* \* \* \* \*